(12) United States Patent
Lo

(10) Patent No.: US 7,305,249 B2
(45) Date of Patent: Dec. 4, 2007

(54) MOBILE PHONE SYSTEM WITH A CARD CHARACTER RECOGNITION FUNCTION

(75) Inventor: Jui-Hsiang Lo, Taipei (TW)

(73) Assignee: Primax Electronics Ltd., Neihu, Taipei (TW)

( * ) Notice: Subject to any disclaimer, the term of this patent is extended or adjusted under 35 U.S.C. 154(b) by 852 days.

(21) Appl. No.: 10/605,915

(22) Filed: Nov. 6, 2003

(65) Prior Publication Data
US 2005/0041862 A1  Feb. 24, 2005

(30) Foreign Application Priority Data
Aug. 18, 2003  (TW) .............................. 92122667 A

(51) Int. Cl.
*H04M 1/00*  (2006.01)

(52) U.S. Cl. ................ 455/550.1; 455/556.1; 348/375

(58) Field of Classification Search ............ 455/550.1, 455/575.1, 556.1; 348/373, 375, 376; 396/5, 396/544
See application file for complete search history.

(56) References Cited

U.S. PATENT DOCUMENTS 2,350,110 A * 5/1944 Hood .......................... 359/612
6,594,503 B1 * 7/2003 Herzig et al. ............ 455/550.1

FOREIGN PATENT DOCUMENTS

TW     423251     2/2001
TW     501835     9/2002

* cited by examiner

*Primary Examiner*—Lester G. Kincaid
*Assistant Examiner*—Steven Lim
(74) *Attorney, Agent, or Firm*—Winston Hsu

(57) ABSTRACT

A mobile phone system with a card character recognition function includes a mobile phone, an image-capturing module for capturing a card image, and a character recognition module for transferring the card image captured by the image-capturing module into character data and for transmitting the character data to the mobile phone.

10 Claims, 7 Drawing Sheets

MOBILE PHONE SYSTEM WITH A CARD CHARACTER RECOGNITION FUNCTION

BACKGROUND OF INVENTION

1. Field of the Invention

The present invention relates to a mobile phone system, and more specifically, to a mobile phone system with a card character recognition function.

2. Description of the Prior Art

In the modern information society, wireless communication development lets people communicate with each other more easily. For example, people can communicate with other people by using mobile phones to exchange their information.

Nowadays mobile phones have become very popular because of the decreasing price and the improvement of technology, such as faster processing speed, larger memory, and more functions. So more and more mobile phones enter the market. Manufacturers also add more additional features and personal managing functions in their mobile phones to satisfy all kinds of consumers. Such features include a calendar, a note pad, a reminder, sending email function, and so on.

Due to rapid development of business, most business people use business cards to introduce themselves. But business card management is a trivial thing. There are some card recognition devices on the market, which can scan cards one by one and transmit the corresponding files to an address book of a computer or a PDA. However the card image scanned by the conventional card recognition device will be recognized into characters in a computer device, and then the character file can be transmitted to other communication facilities such as mobile phones. Therefore it is inconvenient to transfer the recognition file. Besides, conventional card recognition devices always scan cards in a line-scanning manner, so it takes a long time due to slower scanning speed.

SUMMARY OF INVENTION

It is therefore a primary objective of the present invention to provide a mobile phone system with a card character recognition function to solve the problems mentioned above.

Briefly summarized, a mobile phone system with a card character recognition function comprises a mobile phone, an image-capturing module for capturing a card image, and a character recognition module for transferring the card image captured by the image-capturing module into character data and transmitting the character data to the mobile phone.

Briefly summarized, a capturing jig for installation below a lens on an image-capturing module of a mobile phone when the mobile phone is capturing an image is proposed. The capturing jig comprises a collapsible ray shade made of opaque material, a close-shooting lens installed inside the collapsible ray shade for providing close-shooting focus, and a light source installed inside the collapsible ray shade for providing light when capturing the image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
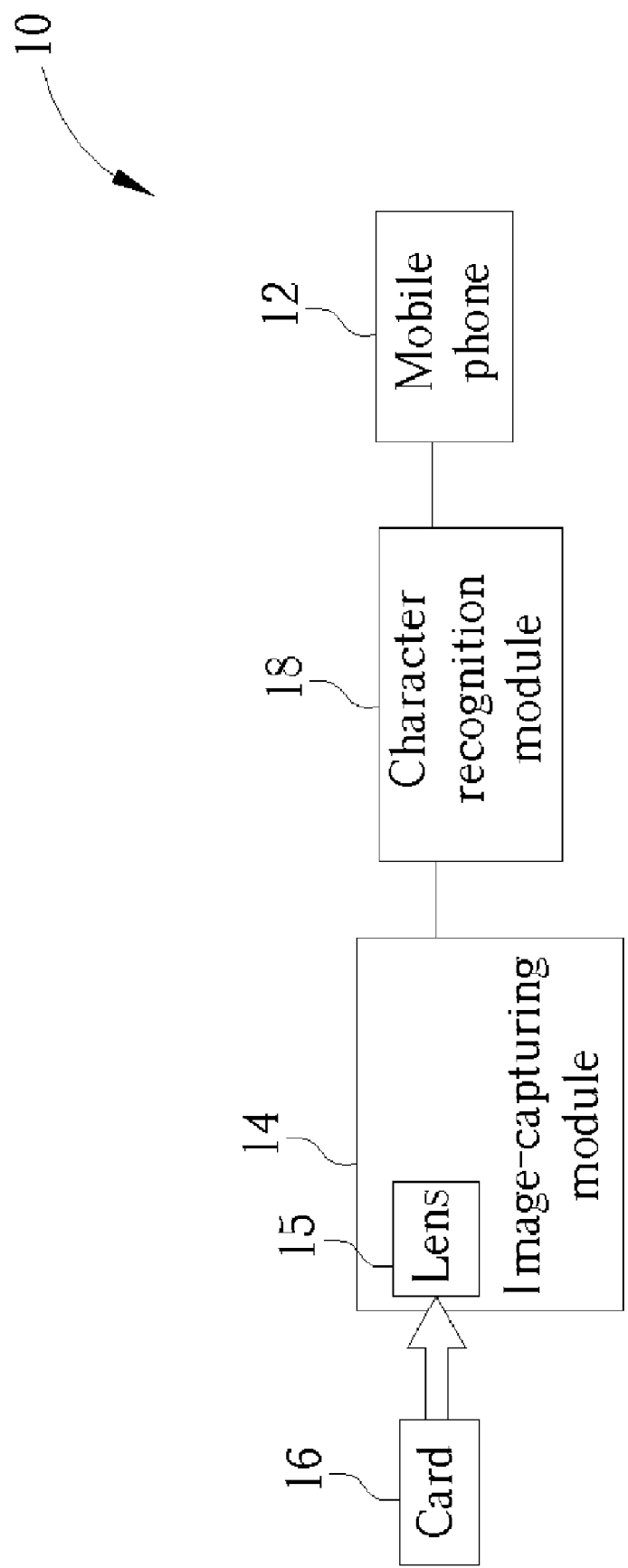
FIG. 1 is a block diagram of a mobile phone system according to a first embodiment of the present invention.

Please refer to FIG. 1. FIG. 1 is a block diagram of a mobile phone system 10 with a card character recognition function according to a first embodiment of the present invention. The mobile phone system 10 includes a mobile phone 12, and an image-capturing module 14 including a lens 15 for capturing an image of a card 16. The image-capturing module 14 can be an external phone camera installed outside the mobile phone 12. The mobile phone system 10 further includes a character recognition module 18 installed outside the mobile phone 12 and connected to the mobile phone 12 and the image-capturing module 14 for transferring the image of the card 16 captured by the image-capturing module 14 into character data and transmitting the character data to the mobile phone 12. The character recognition module 18 can be an optical character recognition system (OCR system), which can extract characters from the image of the card 16 captured by the image-capturing module 14, compare the characteristic of the characters with ones in the characteristic database, and at last transmit the corresponding characters to the mobile phone 12. The character recognition technology is in common use, so the detailed description is not mentioned anymore.

Figure 2:
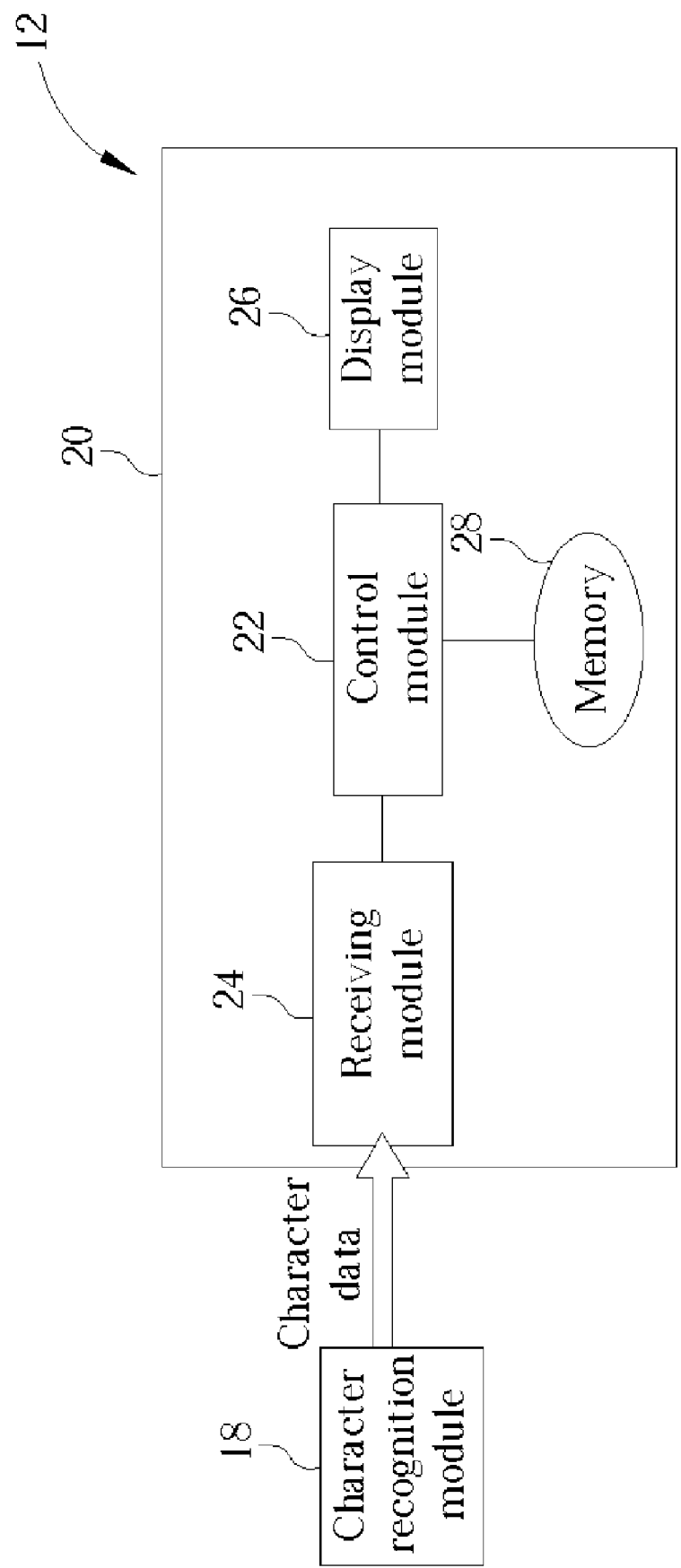
FIG. 2 is a block diagram of a mobile phone.

Please refer to FIG. 2. FIG. 2 is a block diagram of the mobile phone 12. The mobile phone 12 includes a housing 20, a control module installed inside the housing 20 for controlling the mobile phone 12, a receiving module 24 installed inside the housing 20 and electrically connected to the control module 22 for receiving character data from the character recognition module 18. The mobile phone 12 further includes a display module 26 installed inside the housing 20 and electrically connected to the control module 22 for displaying character data recognized by the character recognition module 18 and received by the receiving module 24. The display module 26 can be an LCD and display information of the operation of the control module 22 to users. The mobile phone 12 further includes a memory 28 installed inside the housing 20 and electrically connected to the control module 22 for storing character data recognized by the character recognition module 18 or operating data of the mobile phone 12. The memory 28 can be any kind of storage media, such as a CF, SD, or MMC card.

Figure 3:
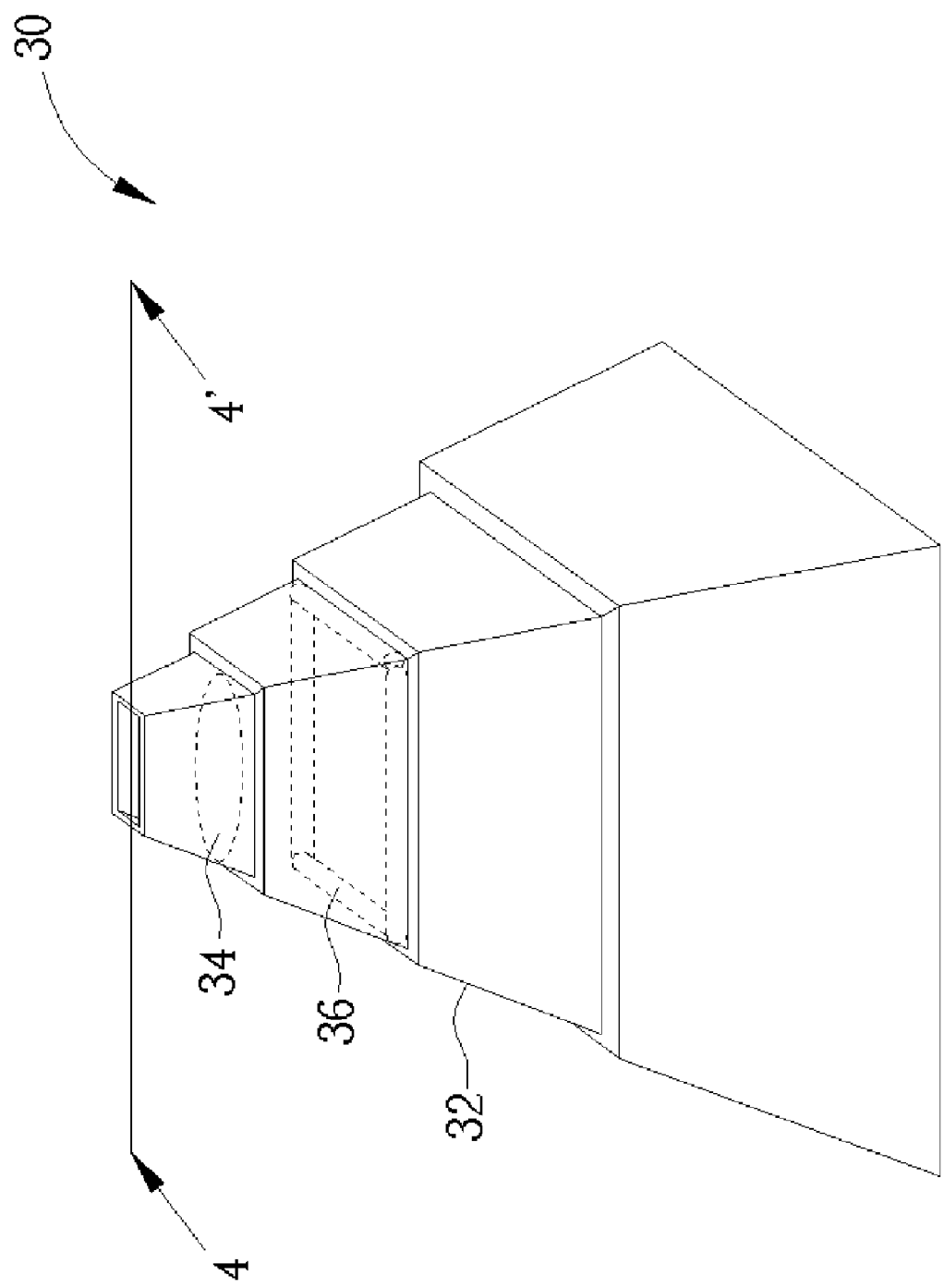
FIG. 3 is a diagram of a capturing jig.
Figure 4:
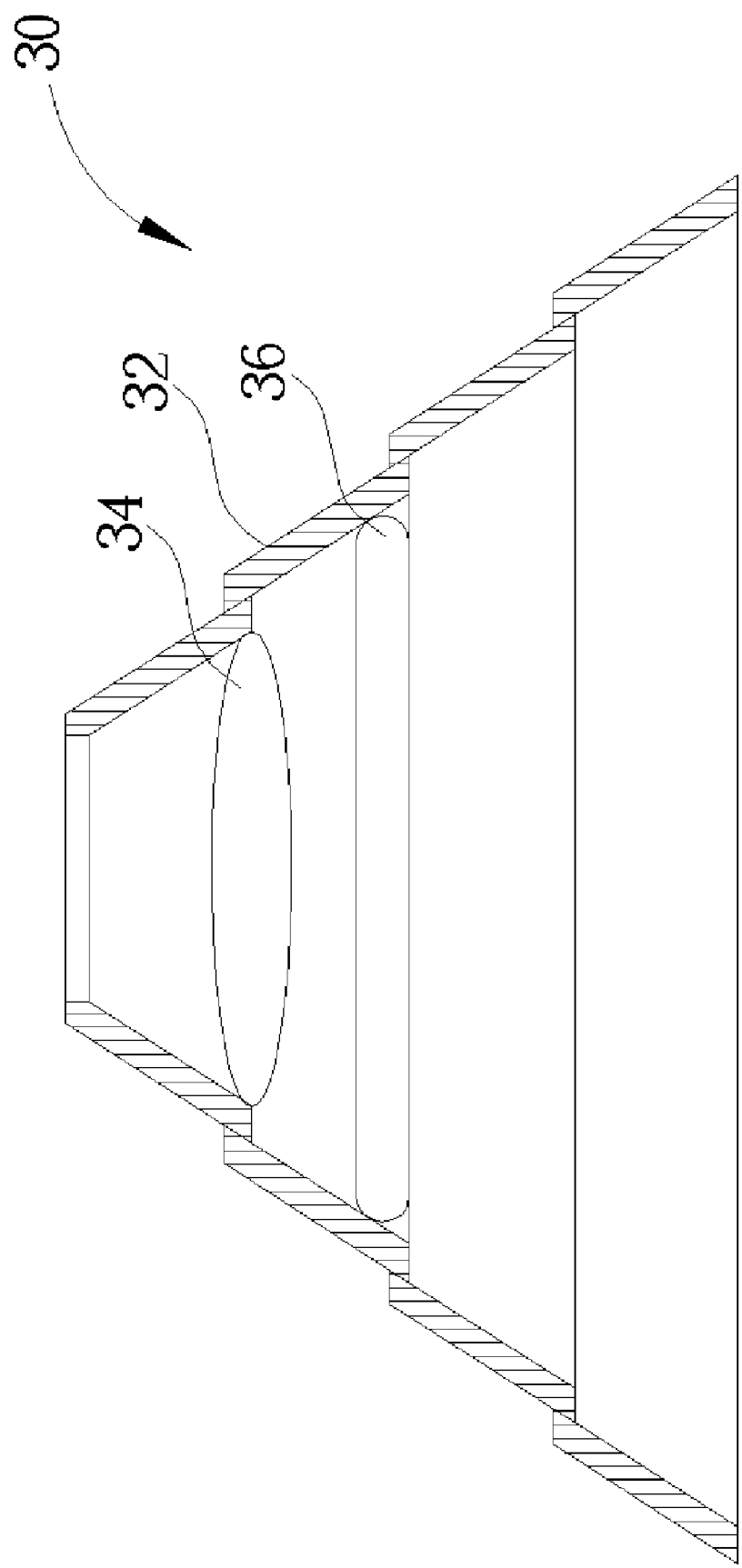
FIG. 4 is a sectional diagram of the capturing jig taken along axis 4-4 in FIG. 3.

The mobile phone system 10 further includes a capturing jig 30 for installation below the lens 15 of the image-capturing module 14. Please refer to FIG. 3 and FIG. 4. FIG. 3 is a diagram of the capturing jig 30, and FIG. 4 is a sectional diagram of the capturing jig 30 taken along axis 4-4' in FIG. 3. The capturing jig 30 includes a collapsible ray shade 32, which is made of opaque material and is a hollow ray shade. It is convenient to users that the collapsible ray shade 32 can be expanded completely when the image-capturing module 14 is capturing the card image and be folded when not being used. The capturing jig 30 further includes a close-shooting lens installed inside the collapsible ray shade 32 for providing close-shooting focus, and a light source 36 installed inside the collapsible ray shade 32 for providing light when capturing an image of the card 16. The light source 36 can contain a white light emitting diode (LED). The route of light emitted by the light source 36 can be designed for covering the bottom of the collapsible ray shade to fill light uniformly, and illumination of the light source 36 can be 25 LUX.

Figure 5:
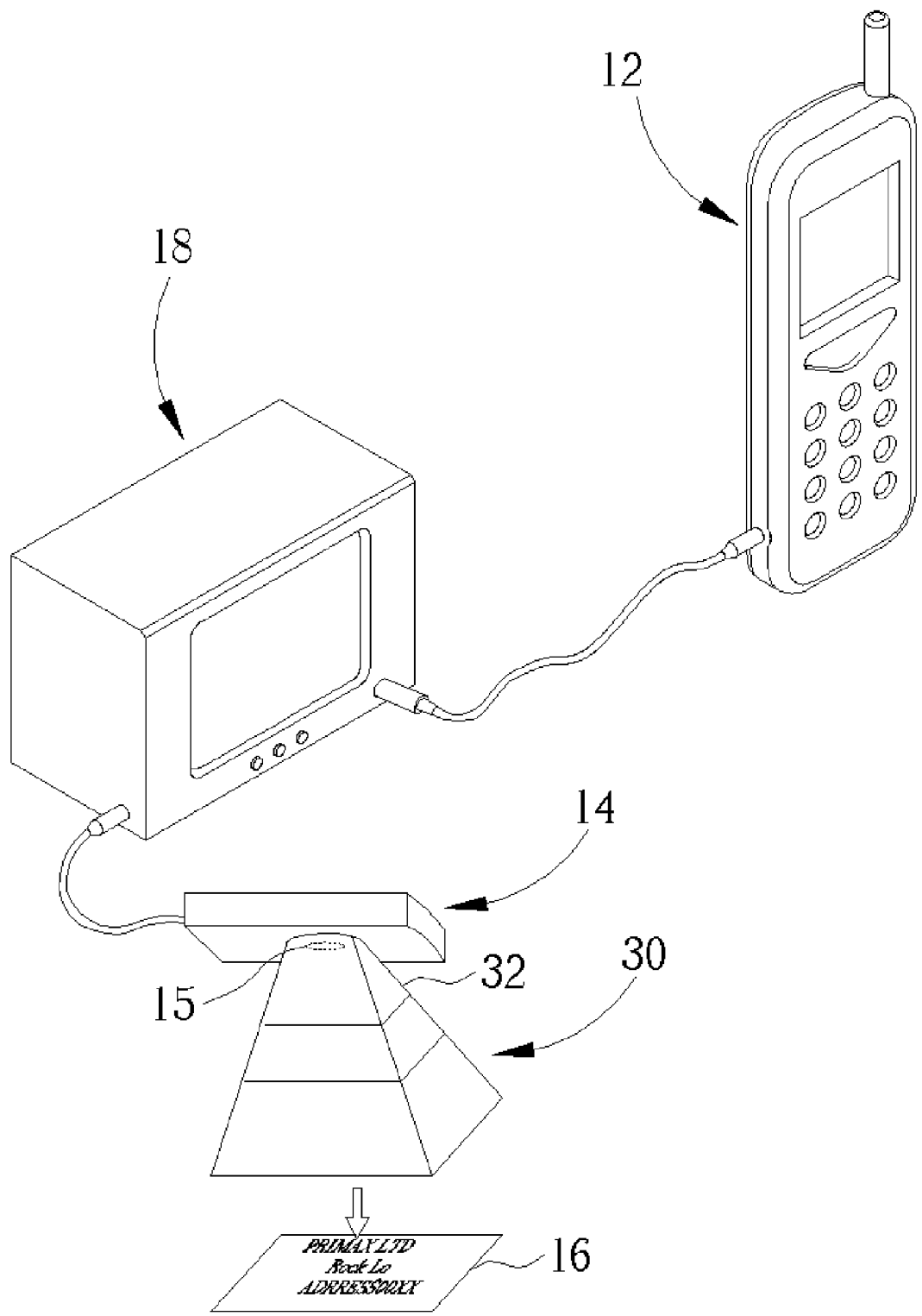
FIG. 5 is a diagram illustrating the mobile phone system capturing an image of a card in the first embodiment.

Please refer to FIG. 5. FIG. 5 is a diagram illustrating the mobile phone system 10 capturing an image of the card 16 in the first embodiment. First users can install the capturing jig 30 below the lens 15 of the image-capturing module 14 and expand the collapsible ray shade 32 completely. The area of the bottom of the collapsible ray shade 32 is about an area of a business card, about 90 mm*55 mm. That is, the capturing jig 30 can cover the card 16 completely so as to make the lens 15 aim at the card 16 for improving quality of the capturing image. The lens 15 of the image-capturing module 14 captures the image of the card 16 in a manner of scanning an entire area instead of scanning lines one by one, so the scanning speed in the present invention is faster than that of the prior art. After the image-capturing module 14 captures the image of the card 16, the image of the card 16 will be transmitted to the character recognition module 18. The character recognition module 18 can transfer the image data of the card 16 into character data, and users can edit and modify the character data by the character recognition module 18 and then transmit the character data to the mobile phone 12. Users can store the character data received by the receiving module 26 into the memory 28, transmit them to the display module 26 for displaying the character data, or send the character data to other people.

Figure 6:
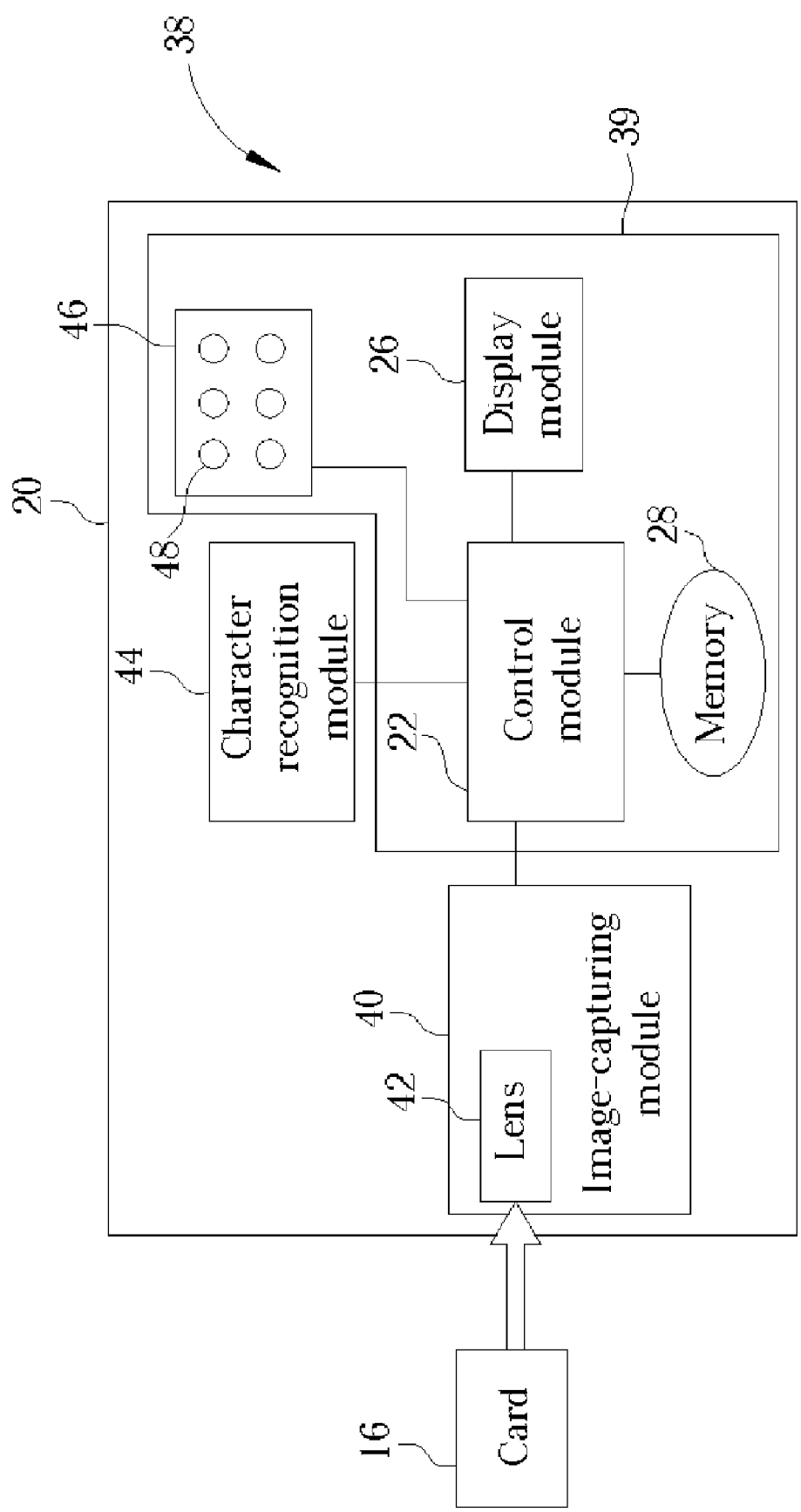
FIG. 6 is a block diagram of a mobile phone system according to a second embodiment of the present invention.

The image-capturing module 14 also can be installed on the housing 20 of the mobile phone 12, and the character recognition module 18 also can be installed inside the housing 20 of the mobile phone 12. Please refer to FIG. 6. FIG. 6 is a block diagram of a mobile phone system 38 according to a second embodiment of the present invention. For simplicity, elements that have the same functions as that illustrated in FIG. 1 and FIG. 2 are provided with the same item numbers used in FIG. 6. The mobile phone system 38 includes a mobile phone 39 including the housing 20, and the control module 22 installed inside the housing 20 for controlling the mobile phone 39. The mobile phone 38 further includes an image-capturing module 40, which is installed inside the housing 20 of the mobile phone 39 and is electrically connected to the control module 22 and includes a lens 42 for capturing an image of the card 16, and a character recognition module 44 installed inside the housing 20 of the mobile phone 39 and electrically connected to the control module 22 for transferring the image of the card 16 captured by the image-capturing module 40 into character data. The mobile phone 39 further includes the display module 26 installed inside the housing 20 and electrically connected to the control module 22 for displaying character data recognized by the character recognition module 40. The display module 26 can be an LCD and display information of the operation of the control module 22 to users. The mobile phone 39 further includes the memory 28 installed inside the housing 20 and electrically connected to the control module 22 for storing character data recognized by the character recognition module 44 or operating data of the mobile phone 39. The memory 28 can be any kind of storage media, such as a CF, SD, or MMC card. The mobile phone 39 further includes an inputting module 46 including a plurality of control buttons for inputting a control signal to the control module 22 to control the mobile phone 39.

Similarly with the first embodiment, the mobile phone system 38 also includes the capturing jig 30 for installation below the lens 42 of the image-capturing module 40. For simplicity, elements of the capturing jig 30 in the second embodiment that have the same functions as that illustrated in FIG. 3 are provided they same item numbers.

Figure 7:
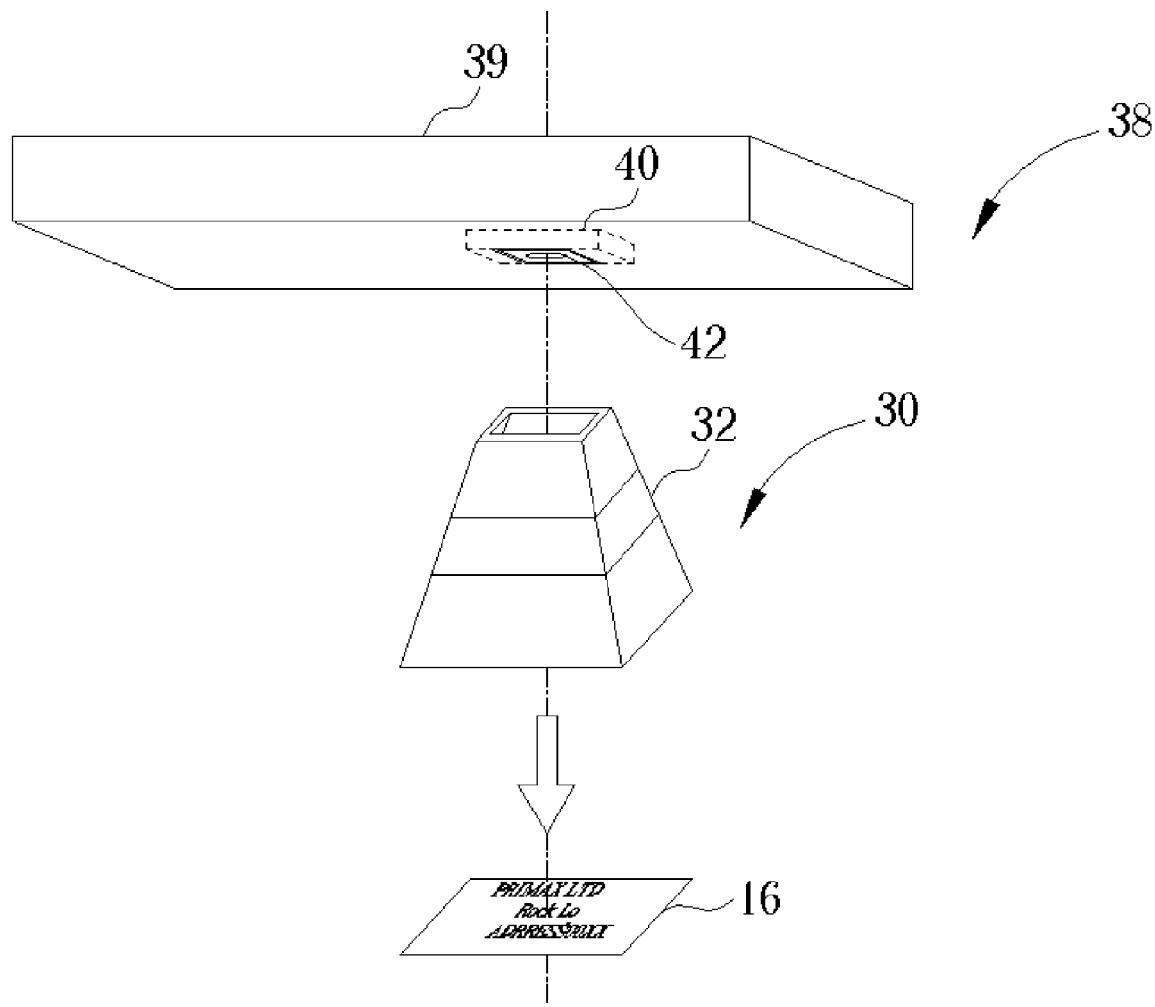
FIG. 7 is a diagram illustrating the mobile phone system capturing an image of the card in the second embodiment.

Please refer to FIG. 7. FIG. 7 is a diagram illustrating the mobile phone system 38 capturing an image of the card 16 in the second embodiment. First users can install the capturing jig 30 below the lens 42 of the image-capturing module 40 and expand the collapsible ray shade 32 completely. The area of the bottom of the collapsible ray shade 32 is about an area of a business card, about 90 mm*55 mm. That is, the capturing jig 30 can cover the card 16 completely so as to make the lens 42 aim at the card 16 for improving quality of the capturing image. The lens 42 of the image-capturing module 40 captures the image of the card 16 in a manner of scanning an entire area instead of scanning lines one by one, so the scanning speed in the present invention is faster than the prior art.

Please refer to FIG. 6. Users can use the control buttons 48 of the inputting module 46 to control the image-capturing module 40 to capture the image of the card 16 and to transfer the image into character data. After the image-capturing module 40 captures the image of the card 16, the character recognition module 44 can transfer the image of the card 16 captured by the image-capturing module 40 into character data. Users can use the inputting module 46 to edit and modify the character data, and then the control module 22 can store the editing character data in the memory 28 or transmit the editing character data to the display module 26 for displaying them.

In contrast to the prior art, the present invention provides the mobile phone system with a card image-capturing and character recognition function. The card file is scanned and recognized by the image-capturing module and the character recognition module and stored in the mobile phone directly. There is no need for users to have to scan images with a scanner connected to a computer, and images are recognized into character data by recognition software in the computer. Besides, conventional card recognition devices always scan cards in line-scanning manner, so it takes a long time due to slower scanning speed. The lens 42 of the image-capturing module 40 in the present invention captures the image of the card 16 in a manner of scanning an entire area instead of scanning lines one by one, so the scanning speed in the present invention is faster than the prior art. The mobile phone system in the present invention makes the card management more convenient.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A mobile phone system with a card character recognition function comprising:
   a mobile phone;
   an image-capturing module for capturing a card image;
   a character recognition module for transferring the card image captured by the image-capturing module into character data and transmitting the character data to the mobile phone; and
   a capturing jig for installation below a lens of the image-capturing module when capturing the card image, the capturing jig comprising:
      a collapsible ray shade made of opaque material;
      a close-shooting lens installed inside the collapsible ray shade for providing close-shooting focus; and
      a light source installed inside the collapsible ray shade for providing light when capturing the card image.

2. The mobile phone system of claim 1 wherein the image-capturing module is a phone camera installed on a housing of the mobile phone.

3. The mobile phone system of claim 1 wherein the light source of the capturing jig contains a white light emitting diode (LED).

4. The mobile phone system of claim 1 wherein the image-capturing module is an external phone camera connected to the character recognition module outside the mobile phone.

5. The mobile phone system of claim 4 wherein the character recognition module is installed outside the mobile phone and connected to the mobile phone and the image-capturing module.

6. The mobile phone system of claim 1 wherein the character recognition module is installed inside a housing of the mobile phone.

7. The mobile phone system of claim 1 wherein the character recognition module is an optical character recognition system (OCR system).

8. The mobile phone system of claim 1 wherein the mobile phone comprises:
a housing;
a control module installed inside the housing for controlling the mobile phone;
a display module installed inside the housing and electrically connected to the control module for displaying character data recognized by the character recognition module; and
a memory installed inside the housing and electrically connected to the control module for storing character data recognized by the character recognition module.

9. A capturing jig for installation below a lens on an image-capturing module of a mobile phone when the mobile phone is capturing an image, the capturing jig comprising:
a collapsible ray shade made of opaque material;
a close-shooting lens installed inside the collapsible ray shade for providing close-shooting focus; and
a light source installed inside the collapsible ray shade for providing light when capturing the image.

10. The capturing jig of claim 9 wherein the light source contains a white light emitting diode (LED).

* * * * *